[19] United States Patent
Narang

[11] 4,131,385
[45] Dec. 26, 1978

[54] ALIGNMENT BUSHING

[76] Inventor: Rajendra K. Narang, 1525 Bonnie Rd., Macedonia, Ohio 44056

[21] Appl. No.: 628,397

[22] Filed: Nov. 3, 1975

[51] Int. Cl.² .................... B23B 39/00; B23B 47/00; B23G 1/00
[52] U.S. Cl. ................................................ 408/241 B
[58] Field of Search .............. 408/72 B, 115 B, 241 B, 408/16

[56] References Cited

U.S. PATENT DOCUMENTS

| 2,744,424 | 5/1956 | Fisher | 408/110 |
| 2,857,790 | 10/1958 | Lee | 408/241 B |
| 2,942,500 | 6/1960 | Conner | 408/72 B |
| 3,097,891 | 7/1963 | Brideau | 408/72 B X |

Primary Examiner—Othell M. Simpson
Assistant Examiner—Travers S. McGehee
Attorney, Agent, or Firm—Maky, Renner, Otto & Boisselle

[57] ABSTRACT

An alignment bushing for twist drills or the like includes a uniform cylindrical guide member having a bore therethrough which guides the drill to the workpiece, and a holder for securing the guide member to a jig plate adjacent the workpiece, the guide member being removable from and reversibly positionable in the holder. After the inner diameter of the guide member has become worn at one end due to repeated use, the guide member may be removed from the holder and reversibly repositioned therein for subsequent twist drill aligning usage. The holder may be selectively positioned along the length of the guide member readily to adapt the bushing to variable spacing occurring between different jig plates and workpieces.

7 Claims, 6 Drawing Figures

U.S. Patent  Dec. 26, 1978  4,131,385
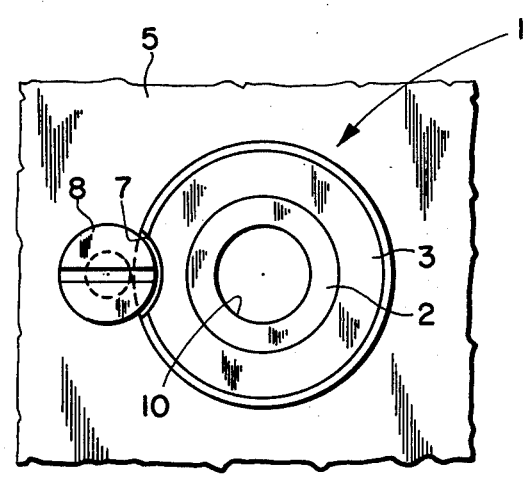
_Fig. 2_
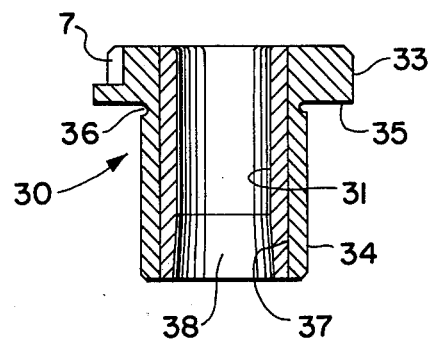
_Fig. 4_
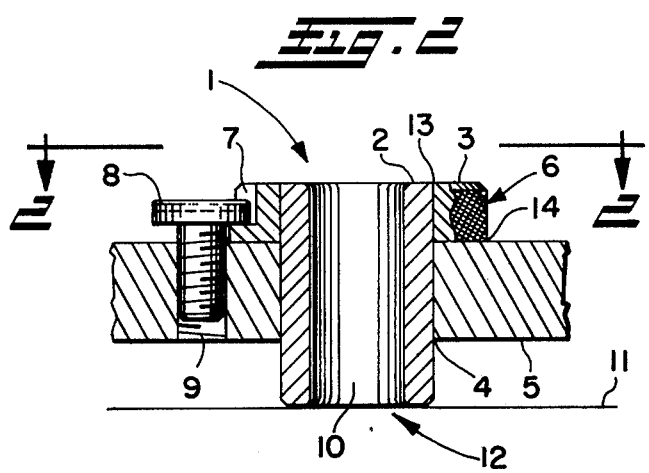
_Fig. 1_
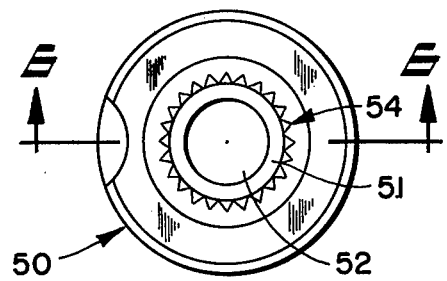
_Fig. 5_
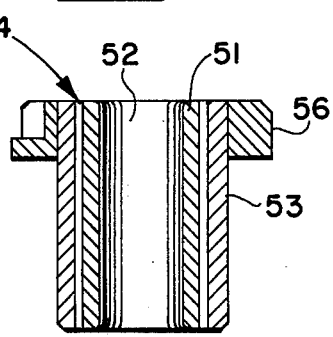
_Fig. 6_
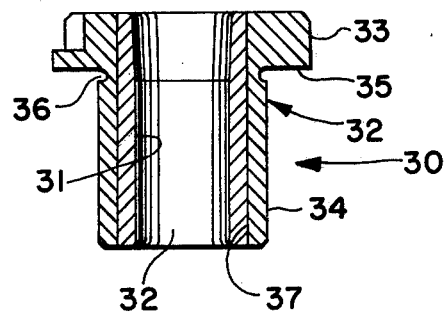
_Fig. 3_

ALIGNMENT BUSHING

BACKGROUND OF THE INVENTION

The present invention is primarily directed to a twist drill aligning bushing, and, more particularly, the invention is directed to such a bushing having a reversible cylindrical guide member removably positioned in a holder for accurately guiding a high speed twist drill or other tool during material removal from a workpiece. The structure shown can also be used for other types of bushing applications, such as reamer bushings.

The use of a bearing or bushing for accurately guiding a twist drill or the like through a jig plate or similar support is disclosed, for example, in U.S. Pat. No. 2,737,425, such patent teaching a coil-form liner positioned within an opening of a jig plate. Another type of prior art drill bushing, i.e. a potted bushing, is disclosed in U.S. Pat. No. 3,322,001, such bushing actually being potted in a plastic mounting a jig plate. Still a further prior art drill bushing includes a guide cylinder having an integral collar portion formed thereon, the guide cylinder being insertable into a jig plate opening and the collar being used to secure the bushing to the jig plate. Drill bushings of the latter type are relatively expensive because they are usually machined from expensive tool steel, such machining including turning the outside of the bushing, drilling the inside thereof, and otherwise forming the knurled collar, chamfers, undercuts and radii, therein. Moreover, it is usually desirable to heat treat a drill bushing for increased strength, but due to the larger thickness and diameter of the material at the collar relative to the thickness and diameter of the material at the guide cylinder, non-uniform heat treating results usually are obtained, whereby the drill bushing itself may become somewhat distorted and may even crack at the intersection of the two differently sized parts.

When a drill bushing is used to guide a high speed rotating twist through a jig plate to a workpiece, the wobble of the twist drill during entrance into the bushing and/or during operation will cause the bushing to wear at the end removed from the workpiece, whereupon the inner diameter of the cylindrical guide at the removed end no longer will be a true cylinder but rather will take on a conical or funnel-like shape, which reduces the accurate alignment function of the drill bushing. When the prior art drill bushings become too worn in this manner, they are usually discarded and replaced in the jig plate by another new, relatively expensive drill bushing.

Moreover, in order to stock an adequate supply of differently sized prior art drill bushings to meet the requirements of its customers, a supplier may have to tie up a large amount of money and space because drill bushings have different inner and outer diameters and different depth or length dimensions, depending on the dimensional parameters of the jig plate openings, of the twist drills, and of the position of the jig vis-a-vis the workpiece.

SUMMARY OF THE INVENTION

The drill bushing of the invention includes an accurately formed, substantially cylindrical guide member, positionable in an opening through a jig plate or the like, and a holder, concentric about at least part of the guide member and coupled thereto for attaching the latter to the jig plate. The guide member is removable from and reversibly positionable in the holder so that after the inner diameter at one end of the guide member has worn it may be removed and repositioned in reverse direction in the holder for subsequent accurate guiding of a twist drill to a workpiece, thus approximately doubling the effective useful life of the bushing. In one form of the invention, the holder is a collar positionable at any location along the length of the guide member so that the exit end of the latter may be raised or lowered relative to the jig plate to adapt the bushing to variable spacing between jig plates and workpieces. In another form of the invention the holder includes a wide collar and a narrower cylindrical portion at least substantially coextensive with the guide member, and the wider diameter collar portion of the holder may be integral or separable relative to the narrower cylindrical portion thereof.

Accordingly, a primary object of the invention is to provide a drill bushing improved in the noted respects.

Another object of the invention is to increase the effective life of a drill bushing.

An additional object of the invention is to reduce the replacement cost for worn drill bushings.

A further object of the invention is to reduce the cost of maintaining a complete inventory of drill bushings.

These and other objects and advantages of the present invention will become more apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but several of the various ways in which the principles of the invention may be employed.

BRIEF DESCRIPTION OF THE DRAWING

In the annexed drawing:

FIG. 1 is a vertical sectional view of a drill bushing in accordance with the invention positioned in an opening of a jig plate;

FIG. 2 is a top plan view of the drill bushing looking in the direction of arrows 2—2 of FIG. 1;

FIG. 3 is a sectional view of a modified drill bushing wherein the cylindrical guide member already has experienced wear proximate the entrance end thereof;

FIG. 4 is a sectional view of the drill bushing of FIG. 3, wherein the cylindrical guide member has been reversibly positioned in its holder;

FIG. 5 is a top plan view of a still further embodiment of the drill bushing in accordance with the invention showing broached connection between the cylindrical guide member and its holder; and FIG. 6 is a sectional view of the drill bushing looking in the direction of the arrows 6—6 of FIG. 5.

DESCRIPTION OF THE PREFERRED EMBODIMENTS

Referring now to the drawing, wherein like reference numerals designate like parts in the several figures, and initially to FIGS. 1 and 2, a drill bushing 1 includes a cylindrical guide member or liner 2 and a holder 3 therefor, the guide member 2 being positioned in an opening 4 of a conventional jig plate 5 or the like. The holder 3 has a knurled exterior surface 6 to facilitate manual handling thereof, and a notch 7 on the holder accommodates a locking screw 8 secured in a threaded opening 9 in the jig plate 5 to clamp the bushing 1 thereto. Alternatively, the holder 3 may be cylindrical in configuration and of a diameter substantially equal to opening 4 to permit the holder to be press fit, shrunk fit, or mechanically joined by welding or staking to the jig plate 5.

The cylindrical guide member 2 has an elongated, accurately formed and dimensioned cylindrical passage or bore 10 to guide a high speed rotating twist drill therethrough to a workpiece 11 located proximate the exit end 12 of the bore. The external diameter of the cylindrical guide member 2 is approximately the size of the diameter of the opening 4 in which it is inserted to fit relatively securely therein without wobble. Moreover, the cylindrical guide member 2 may be formed of tool steel, other ferrous or non-ferrous material, sintered powder material, ceramic material, high speed steel, heat treated or otherwise hardened material, or the like to provide strength and longevity for the guide member under the operating conditions experienced. Also, the guide member 2 may be plated or coated by known techniques to reduce friction and to provide increased hardness and resistance to wear at the working temperatures and conditions.

The holder 3 may be formed of less exotic and thus less expensive material than that from which the cylindrical guide member 2 is formed since the holder is not exposed to the wear by the twist drill that the cylindrical guide member experiences. The holder 3 may be formed as a cylinder of a shorter longitudinal extent than the cylindrical guide member 2, and preferably the holder 3 has a central opening 13 of an inner diameter approximately equal to or slightly smaller than the outer diameter of the cylindrical guide member 2. Thus the holder 3 may be attached to the cylindrical guide member 2 by conventional press fitting technique, by shrink fitting technique or by slip fitting technique with spot welding or the like for coupling thereof so as to form a collar relatively integral with, but nevertheless removable from, the cylindrical guide member 2. Such separation of the cylindrical guide member 2 and the holder collar 3 may be effected by using a pulling tool or the like and/or by breaking the spot welds between the two. Moreover, the holder collar 3 preferably has a substantially flat surface 14 adapted for flat abutment with the confronting surface of the jig plate at the opening 4 therein in furtherance of secure, motion-free mounting of the bushing 1 on the jig plate 5.

Additionally, the outside diameter of the guide member 2 may be provided with threads adjacent its two ends. Similarly, the inside of the holder 3 could be formed with cooperating threads so that the guide member and holder could readily be joined and disconnected by screwing and unscrewing, respectively.

Preferably the holder collar 3 may be positioned at any desired location along the longitudinal extent or length of the cylindrical guide member 2. Therefore, adjustment of the holder relative to the guide member may be made from one application to another to maintain the guide member directly adjacent the workpiece by correlating the position of the holder to the spacing between the jig plate and workpiece. Moreover, different guide members having equal outer diameters but different respective inner diameters or bores 10 may be replaced in the holder 3 to adapt the bushing 1 for guidance of twist drills of different respective sizes. Alternatively, an additional guide member or members could be positioned in the guide member 2, similarly to reduce the diameter of the bore 10 through the bushing.

As is described above, a high speed rotating twist drill may not be advanced through the bushing in a straight line thereby causing contact and wear may also wobble slightly about the drill contact point with the workpiece during material removal. The magnitude of this lateral operational wobble increases, of course, along the drill bit thereby slowly causing the top end of the guide member to become worn by contact between the rotating drill bit and the bore wall. After a number of such contacts have occurred, the cylindrical guide member 2 may experience a conical-like or funnel-like wearing at the entrance end of the passage 10 in the manner illustrated, for example, in the drill bushing 30 illustrated in FIG. 3. Such wearing and enlargement of the entrance end of the passage 10 will reduce the aligning accuracy of the drill bushing 1. However, in accordance with the invention, when such inaccuracy of alignment becomes intolerable, the drill bushing 1 may be removed from the jig plate 5 and the cylindrical guide member 2 may be removed from the holder 3. The cylindrical guide member 2 may then be reversed and re-inserted, as well as re-secured, if necessary, to the holder 3, after which the drill bushing 1 may be replaced in the opening 4 in the jig plate 5 with the worn portion of the passage 10 in the cylindrical guide member 2 then being at the exit end 12 thereof, generally in the manner illustrated for example, in FIG. 4. Thus, the entrance end of the drill bushing 1 is again relatively accurately dimensioned to receive a high speed rotating twist drill and to guide the same accurately to a location on a workpiece. Moreover, after both ends of the passage 10 in the cylindrical guide member 2 have become worn to an intolerable extent, the worn cylindrical guide member or liner 2 may be replaced in the holder 3 by another new cylindrical guide member.

It will also be appreciated that the variable positioning of the holder 3 permits, if desired, the work end or ends of the guide member 2 to be removed and the collar repositioned thereon. This capability results not only in the guide member having twice the length of service for a given bushing length because of reversibility, but also in the guide member having continued use for shorter bushing lengths.

Turning now more particularly to FIGS. 3 and 4, a modified form of drill bushing is generally indicated at 30. The modified drill bushing 30 includes a cylindrical guide member 31 and a holder therefor, indicated generally at 32. The holder 32 has a collar portion 33 and a cylindrical support portion 34. The collar portion 33 is similar in form and function to the holder collar 3 described above with reference to FIG. 1. The flat wall surface 35 of the collar 33 may abut the flat surface of a jig plate in furtherance of motion-free mounting of the bushing 30 on the jig plate. An undercut 36 at the juncture of the wall 35 and the exterior cylindrical wall of the holder support portion 34 eliminates the possibility of material build-up at that juncture which might otherwise preclude flat abutment of the wall 35 with the surface of the jig plate.

The diameter of the interior cylindrical wall 37 of the holder 32 is approximately the same as the external diameter of the cylindrical guide member 31 so that the latter may fit snugly in the holder 32, either by press fitting, shrink fitting, slip fitting with spot welding, or the like, as described above. Such temporary connections between the cylindrical guide member 31 and the holder 32 permit the same to form a unitary drill bushing during operation. The cylindrical guide member 31 also has an accurately formed, substantially cylindrical passage 38 therethrough for guiding a rotating twist drill through an opening in a jig plate to a workpiece for accurately positioning the hole in the workpiece, and for confining the material runout to the bore. Preferably, the cylindrical guide member 31 is formed of a material similar to that from which the cylindrical guide member 2, described above with reference to FIG. 1, is formed, and the holder 32 may be formed of less exotic material, thus reducing the cost of the bushing 30. Also, the thickness of the guide member or liner 31 may be reduced compared to the liner of FIG. 1 because of the increased lateral support resulting from cylindrical support portion 34. The reduced liner thickness results in a lower price because a smaller amount of the higher cost material may be used. As with the FIG. 1 embodiment, guide member 31 may be removed after inner diameter wear at one end and may then be reversed and reinserted for subsequent use as sequentially illustrated in FIGS. 3 and 4, thereby to double the effective life of the bushing.

Referring now to FIGS. 5 and 6, a further modified drill bushing 50 is illustrated. The drill bushing 50 includes a cylindrical guide member or liner 51 having an accurately formed, substantially cylindrical central passage or bore 52 therethrough for guiding a rotating twist drill through a jig plate to a workpiece. The liner 51 is temporarily received in and secured to an outer cylindrical holder 53 substantially coextensive in length with the liner and preferably manufactured from a less expensive material. The cylindrical holder 53 has a broached inner diameter indicated generally at 54 to limit the contact areas between the two surfaces and thus reduce the pressure, while maintaining a motion-free but temporary connection between the same. A holder collar 56 is secured to the exterior wall 57 of the support holder 53 by press fitting, shrink fitting, or slip fitting and spot welding, as described above.

The holder collar 56 and cylindrical support holder 53 cooperate with each other to form an integral holder similar to the holder 32 described above with reference to FIGS. 3 and 4. However, as opposed to the FIG. 3 embodiment, the holder collar 56 may be selectively moved along the length of the holder 53 as required by the position of the jig plate vis-a-vis the workpiece and by the longitudinal extent of the liner. Moreover, since the holder collar 56 is separable from the support holder 53, each of those two parts may be manufactured in a relatively facile manner, compared to the integral holder 32 described above with reference to FIGS. 3 and 4.

The embodiment of FIG. 6 functions in essentially the same manner as the other embodiments described above. Specifically, the guide member or liner 51 upon inner, upper wear can be removed, reversed, and reinserted for subsequent usage. Moreover, the collar 56 may be adjusted along the cylindrical support holder 53 as dictated by the circumstances.

In all the embodiments, the liner or guide member is a hollow cylinder uniform in thickness from end to end. This construction permits the guide member to be easily built and uniformly heat treated, if necessary. Moreover, the inner diameter surface of any of the holders may be formed to reduce the pressure on the liner being used in all of the embodiments. Generally speaking, the inner diameter of the holder adjacent the guide member or liner will be provided with a straight bore for thick liners, a tapered bore for slightly thinner liners, a straight broach bore for medium thickness liners (see FIG. 5), and a tapered broach bore for thin, delicate liners. The holder may also be pierced along a part of its longitudinal extent in one or more circumferential locations as a method of reducing the pressure on the guide member.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. An alignment bushing positionable in an opening through a jig plate or the like for accurately guiding a tool through the jig plate to a workpiece, comprising a cylindrical guide member insertable in the jig plate opening and having a substantially uniform, cylindrical central passage therethrough for guiding the tool to the workpiece and a substantially uniform, cylindrical exterior surface and holding means concentric about at least a part of said guide member and temporarily selectively coupled thereto at any location along the guide member required to attach the guide member to the jig plate for accurate guiding of the tool to the workpiece, said guide member being removable from and reversibly positionable in said holding means, whereby the guide member may selectively be reversed after wearing of one end thereafter to present the uniform end of the passage to the tool for guidance purposes, and said holding means being coextensive with the longitudinal extent of said guide member, whereby said guide member forms an insert within a cylindrical passage in said holding means.

2. A drill bushing as set forth in claim 1, said member in said holding means being press fit to form an integral member.

3. A drill bushing as set forth in claim 1, said member and said holding means being shrunk fit to form an integral member.

4. A drill bushing as set forth in claim 1, said member and said holding means being slip fit therein and temporarily connected thereto to form an integral member.

5. A drill bushing as set forth in claim 1, said holding means comprising a single part having a reduced cross-section support portion in direct engagement with said cylindrical guide member, and an enlarged collar portion.

6. A drill bushing as set forth in claim 5, further comprising an undercut portion at the juncture of said collar portion and said support portion of said holding means to allow said collar portion to abut a confronting surface of the jig plate.

7. A drill bushing as set forth in claim 1, said holding means comprising two separable portions, one forming a support holder portion in direct engagement with said cylindrical guide member and the other forming a movable collar secured to said support holder portion.

* * * * *